United States Patent

[11] 3,632,055

| [72] | Inventor | Robert W. Stoffel<br>Ferndale, Mich. |
|---|---|---|
| [21] | Appl. No. | 2,564 |
| [22] | Filed | Jan. 13, 1970 |
| [45] | Patented | Jan. 4, 1972 |
| [73] | Assignee | Jim Robbins Seat Belt Company<br>Mountain Clemens, Mich. |

[54] SEAT BELT RETRACTOR
14 Claims, 8 Drawing Figs.

[52] U.S. Cl............................................................ 242/107.4
[51] Int. Cl............................................................. A62b 35/02
[50] Field of Search............................................. 242/107 R,
107 SB, 107.4, 107.5, 107.6, 107.7; 297/386, 388,
389; 280/150 SB

[56] References Cited
UNITED STATES PATENTS

| 3,412,952 | 11/1968 | Wohlert et al. | 242/107.4 |
|---|---|---|---|
| 3,348,789 | 10/1967 | Hirsch | 242/107.4 |
| 3,446,454 | 5/1969 | Kovacs et al. | 242/107.4 |
| 3,450,368 | 6/1969 | Glauser et al. | 242/107.4 |
| 3,482,799 | 12/1969 | Wrighton et al. | 242/107.4 |

*Primary Examiner*—Stanley N. Gilreath
*Assistant Examiner*—Werner H. Schroeder
*Attorneys*—Marvin Bressler and Jonathan Plaut ABSTRACT: A seat belt retracting reel assembly including a U-shaped support bracket rotatably supporting a reel having ratchet members at either end thereof and with an elongated flexible seat belt element connected to the reel and wound thereabout. A locking pawl is supported between the sidewalls of the support bracket and is movable between locked and unlocked positions for respectively preventing and allowing rotation of the reel. There is also included an input member rotatable with one of the ratchet members and having a spiral cam track to coact with a holdout member for moving the holdout member radially so that the latter prevents the locking pawl from moving to the locked position during initial unwinding of the flexible seat belt. A platelike clutch member is mounted coaxially with the reel and is biased into frictional engagement with the other ratchet member so as to rotate therewith. A projection extends from he locking pawl and is disposed in a slot in the clutch member. The slot has a first leg which is disposed about the projection as the clutch member is rotated in response to initial unwinding of the seat belt to prevent the locking pawl from moving to the locked position. The slot has a second leg which is disposed about the projection after the seat belt has been fully extended and there is a slight winding rotation followed by unwinding to move the locking pawl to the locked position in engagement with the ratchet members.

INVENTOR.
Robert W. Stoffel
BY
Barnard, McGlynn & Reising
ATTORNEYS

INVENTOR.
Robert W. Stoffel
BY
Barnard, McGlynn & Reising
ATTORNEYS

SEAT BELT RETRACTOR

This invention relates to safety seatbelt assemblies of the type utilized in automobiles as restraining devices. It has been common practice to utilize rollup or retracting assemblies which wind up or retract at least one-half of the disconnected seat belt sections so that such sections do not remain loosely disposed on the seat when not in use. The deficiency in such devices is that the passengers rarely realize the amount of belt remaining in the retraction device once the belt is unwound therefrom. The biasing action, which tends to retract the seat belt into the retraction device, is such that a passenger may buckle a seat belt believing that both sections of the seat belt are fully extended and are, therefore, taut or tight, i.e., cannot be further extended. In actuality, however, and in many cases, the seat belt is not fully extended and in the event of a crash or sudden stop the seat belt will fully extend allowing the passenger to move a dangerous amount.

In order to alleviate this problem, there have been provided retracting assemblies wherein the retracting device is locked to prevent further extension of the seat belt once the seat belt has been partially extended and coupled about the passenger. Normally, the seat belt user will pull the two halves of the seat belt so that at least one half is extended from the retracting assembly to the point where the seat belt halves are coupled together after which there occurs a slight bit of winding or retraction. To prevent further extension or unwinding, retracting assemblies have been developed to include a locking member which prevents further extension of the seat belt once it has been extended and is allowed to retract or rewind the slight amount. Although prior art assemblies have been found satisfactory, they are sometimes difficult to assemble because of the large number of components and the complexity with which they are combined and they are frequently susceptible to malfunction.

Accordingly, it is an object and feature of this invention to provide a retracting reel assembly which overcomes the problems associated with the prior art assemblies by including a holding means engageable with a locking means for preventing the locking means from moving to the locked position during initial unwinding of the seat belt from the reel means and actuator means responsive to rotation of the reel means for preventing the locking means from moving to the locked position as the flexible element is unwound and for thereafter moving the locking means to the locked position upon a slight winding rotation followed by unwinding rotation of the reel means.

In correlation with the foregoing object and feature, it is another object and feature of this invention to provide such a retracting reel assembly wherein the locking means includes a projection and the actuation means includes a slot through which the projection extends with the slot having a first leg for disposition about the projection as the actuation means moves in response to initial unwinding rotation of the reel means to prevent the locking means from moving toward the locked position and a second leg for disposition about the projection as the actuation means moves in response to the slight winding rotation followed by unwinding rotation of the reel means to move the locking means to the locked position.

Other objects and attendant advantages of the present invention will be readily appreciated as the same becomes better understood by reference to the following detailed description when considered in connection with the accompanying drawings wherein:

FIG. 1 is a plan view of a preferred embodiment of the instant invention;

Figure 5:
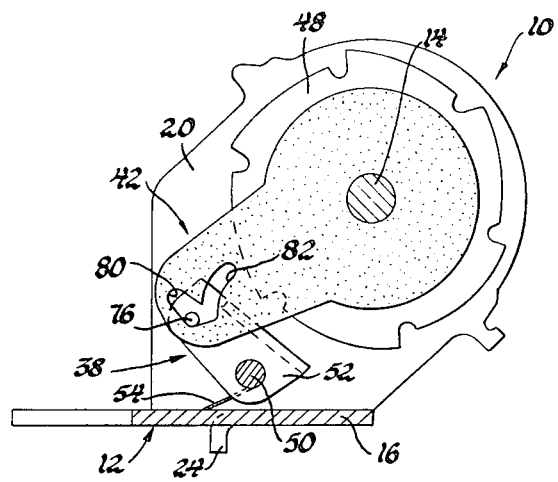
FIG. 5 is a cross-sectional view taken substantially along lines 5—5 of FIG. 2 showing the assembly in the fully retracted position.
Figure 6:
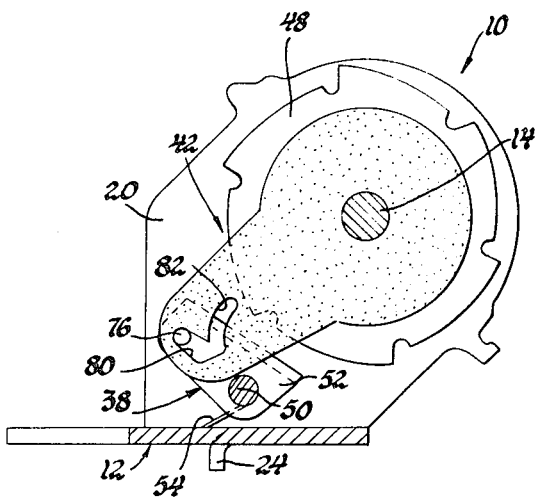
FIG. 6 is a view similar to FIG. 5 showing the position of the components during initial unwinding of the seat belt.
Figure 7:
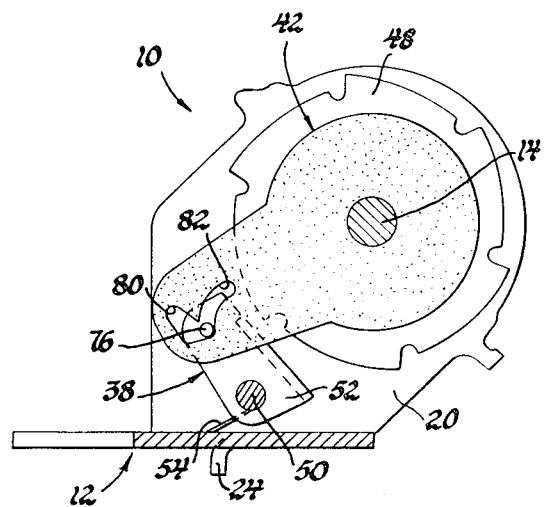
Figure 8:
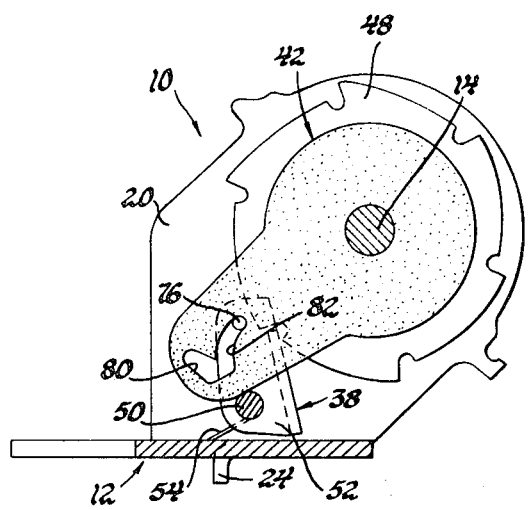

FIG. 7 is a view similar to FIGS. 5 and 6 but showing the components of the assembly in the position after the seat belt has been fully retracted followed by a slight retraction; and FIG. 8 is a view similar to FIGS. 5 through 7 but showing the components in the position after the seat belt has been fully extended and there has been a slight amount of winding rotation followed by unwinding rotation.

Referring now to the drawings wherein like numerals indicate like or corresponding parts throughout the several views a retracting reel assembly constructed in accordance with the instant invention is generally shown at 10.

The assembly 10 includes a support means defined by a generally U-shaped bracket generally indicated at 12 and a shaft 14. The U-shaped bracket 12 has a base 16 and parallel sidewalls 18 and 20. The base 16 has a hole 22 therethrough and a tab 24 extending downwardly therefrom for attaching the support bracket to the floor of a vehicle or the like. The shaft 14 is rotatably supported by the sidewalls 18 and 20 through the bushings 26 and 28. The shaft 14 has a flat portion 30 which extends through and is rotatable in the bushing 28.

The assembly also includes a reel means generally shown at 32 rotatably supported by the shaft 14 for rotation relative to the support bracket 16.

An elongated flexible seat belt element 34 is connected to the reel means 32 and is adapted to be wound thereon and unwound therefrom. The seat belt 34 is connected to a tongue 36 by being looped through an opening therein and the tongue 36 is adapted to be connected to a buckle assembly.

The assembly also includes locking means generally indicated at 38 and supported by the support bracket 16 for movement between a locked position, as shown in FIG. 8, for preventing rotation of the reel means 32 and an unlocked position, as shown in FIGS. 1 through 3, 5 and 6, for allowing rotation of the reel means 32.

Also included is a holding means generally shown at 40 and engageable with the locking means 38 for preventing the locking means 38 from moving to the locked position during initial unwinding of the seat belt 34 from the reel means 32.

Further, there is included actuator means generally indicated at 42 and responsive to rotation of the reel means 32 for preventing the locking means 38 from moving to the locked position as the seat belt is being unwound and for thereafter moving the locking means 38 to the locked position upon a slight winding rotation followed by unwinding rotation of the reel means 32.

The reel means 32 includes a cylinder 44 disposed concentrically about the shaft 14 and a pair of circular platelike ratchet members 46 and 48. The ratchet members 46 and 48 are secured to opposite ends of the cylinder 44. The ratchet member 48 has a hole therein which conforms to the end of the shaft 14 having the flat portion 30. The ratchet members 46 and 48 are therefore supported by the shaft 14 for rotation relative to the U-shaped bracket 16 in that the shaft 16 is rotatably supported in the sidewalls 18 and 20 of the support bracket 16. Although not shown, the cylinder 44 has a slot extending therealong and the flexible seat belt element 34 is connected to the shaft 14 and is looped thereabout and extends through the slot to be wound and unwound about the cylinder 44 between the ratchet members 46 and 48.

The reel means 32 also includes a biasing means comprising a band-type spring 47 which is attached at one end in a slot in the end of the shaft 14 and is attached at the other end to a housing 49 which is in turn secured to the sidewall 20 of the support bracket 16. The spring 47 urges the reel means to rotate in a winding direction.

The locking means 38 includes a pin 50 extending between and supported by the sidewalls 18 and 20 of the support bracket 16. The locking means also includes the locking pawl 52 which is rotatably supported by the pin 50 for movement between the locked and unlocked positions. The locking pawl 50 comprises a platelike member extending between the walls of the support bracket 16 and rearwardly extending flanges through which the pin 50 extends. A biasing means comprising the spring 54 urges the locking pawl 52 toward the locked position. Also included is a tab 56 secured to the locking pawl 52.

Figure 2:
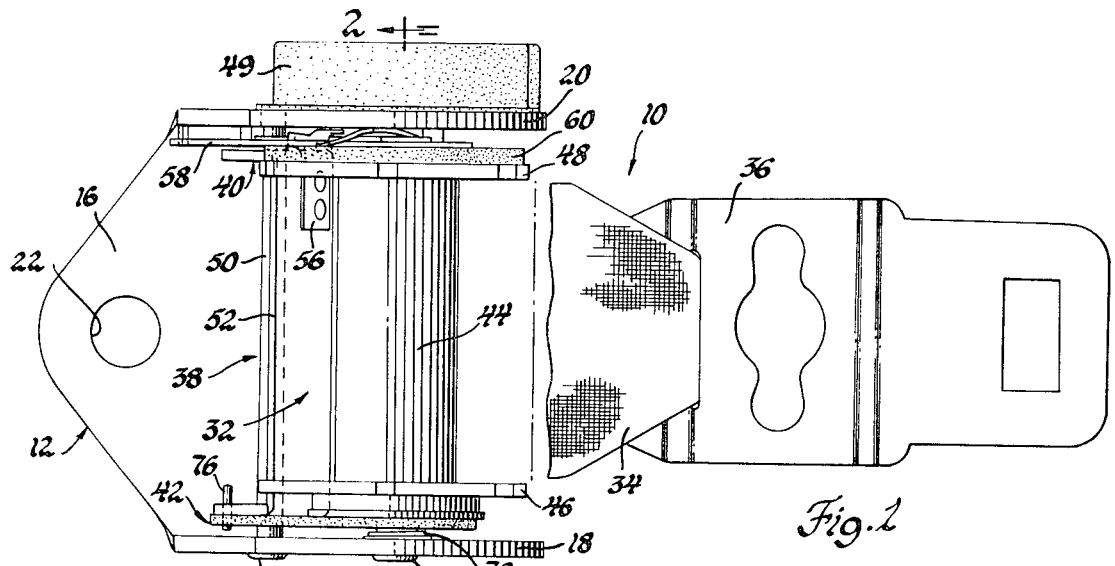
FIG. 2 is an enlarged cross-sectional view taken substantially along lines 2—2 of FIG. 1.
Figure 2:
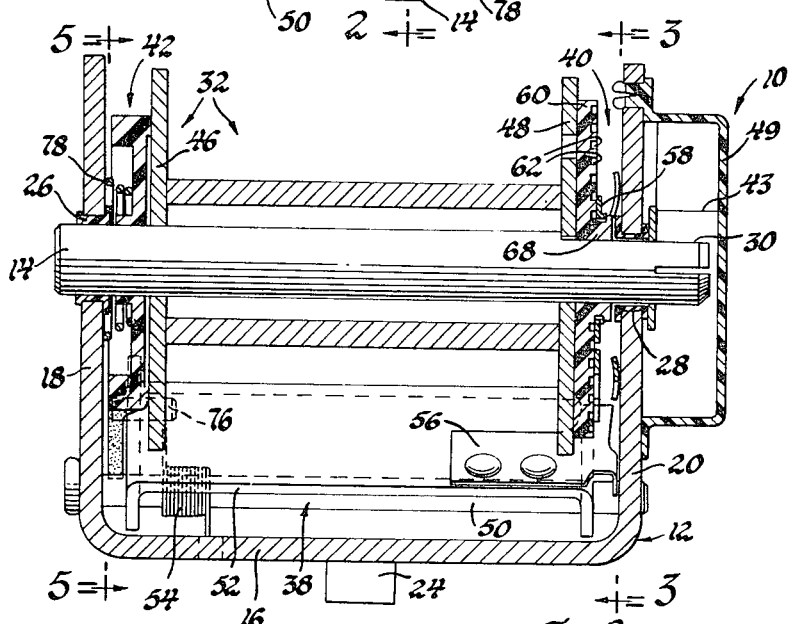
Figure 4:
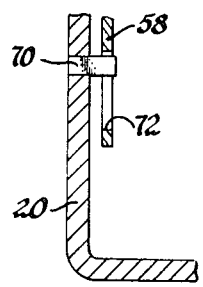
FIG. 4 is a fragmentary cross-sectional view taken substantially along lines 4—4 of FIG. 3.
Figure 3:
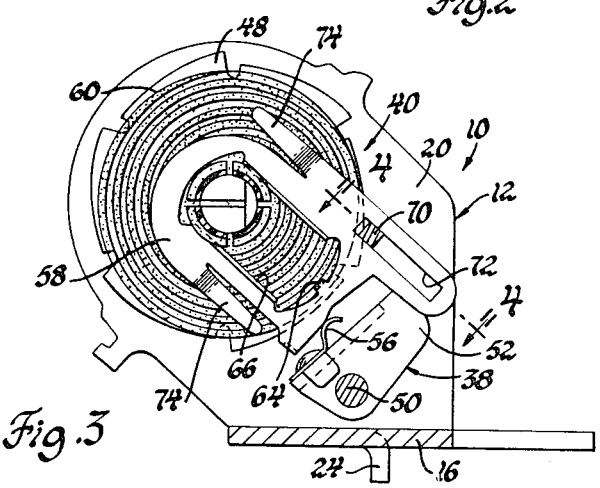
FIG. 3 is a cross-sectional view taken substantially along lines 3—3 of FIG. 2.

The holding means includes a holdout member 58 movable between a first position as illustrated in FIG. 3 engaging the tab 56 of the locking means and a second position out of engagement with the tab 56 of the locking means. The holding means also includes an input member 60 responsive to rotation of the reel means 32 for moving the holdout member 58 from the first position illustrated in FIG. 3 toward the second position during unwinding rotation of the reel means 32 and in the opposite direction during winding rotation of the reel means 32. The input member 60 is a circular camlike member disposed for rotation with the ratchet member 48. The input member 60 has an opening therethrough which conforms to the end of the shaft 14 having a flat portion 30 so as to be rotatable with the shaft 14 and therefore rotatable with the ratchet members 46 and 48. The input member 60 includes a cam track 62 spirally disposed about the axis of the shaft 14. The holdout member 58 includes a bent out tab or cam follower 64 disposed in the cam track 62 for moving the holdout member 58 radially relative to the axis of the shaft 14 during winding and unwinding rotation of the reel means 32. The holdout member 58 has an elongated opening therein with flanges 66 on either side thereof with the elongated opening disposed about the shaft 14. The input member 60 has an outwardly extending collar 68 with an annular groove therein in which the flanges 66 are slidably disposed. A peg 70 extends from the sidewall 20 and into a slot 72 in the holdout member 58 so as to interconnect the holdout member 58 and the adjacent sidewall 20 for preventing the holdout member 58 from rotating about the axis of the shaft 14. The holdout member 58 is preferably made of a thin sheet metal or plastic and includes the springlike tabs 74 to urge the holdout member 58 against the face of the input member 60.

As is clear from the foregoing description, upon rotation of the reel means 32 the input member 60 rotates so that the tablike cam follower 64 will move radially because of the spiral orientation of the cam track 62 in which it is disposed.

The locking means 38 includes a projection 76. The actuation means 42 comprises a platelike clutch member supported coaxially with the reel means 32 for rotation about the axis of the shaft 14. The clutch member 42 is rotatably disposed on the shaft 14. The clutch member 42 is also in frictional driven engagement with the ratchet member 46 and a biasing means comprising the coil spring 78 urges the clutch member 42 into frictional engagement with the ratchet member 46.

The clutch member 42 has a slot therein through which the projection 76 extends. The slot has a first leg 80 which is disposed about the projection 76 as the clutch member 42 moves in response to initial unwinding rotation of the reel means 32 to prevent the locking pawl 52 from moving toward the locked position. The slot also has a second leg 82 which is disposed about the projection 76 as the clutch member 42 moves in response to the slight winding rotation followed by the unwinding rotation of the reel means 32 to move the locking pawl 52 to the locked position illustrated in FIG. 8. The slot is generally V-shaped with the legs 80 and 82 thereof diverging from one another from an apex, the apex having a slightly flattened portion at the bottom as illustrated in FIGS. 5 through 8.

The clutch member 42 is mounted about the shaft 14 and in frictional engagement with the ratchet member 46 so as to rotate with the ratchet member 46 of the reel means 32 during the winding rotation of the reel means to urge the apex of the slot into engagement with projection 76. The first leg 80 of the slot is disposed along an arc having a center coincident with the axis of rotation of the reel means, i.e., the axis of the shaft 14. The second leg 82 of the slot is arcuate in the opposite direction and accommodates the forward movement of the projection 76 resulting from forward rotational movement of the locking pawl 52 as well as counterclockwise rotation of the clutch plate 42 as viewed in FIGS. 5 through 8.

In the operation of the assembly, the assembly is normally in the fully retracted position illustrated in FIGS. 1 through 3 and 5. In this position, the holdout member 58 engages the tab 56 to hold the locking pawl 52 out of engagement with the teeth in the ratchet members 46 and 48, i.e., the unlocked position. When the locking pawl 52 is held in this position, the projection 76 thereof is in the position illustrated in FIG. 5. Upon unwinding of the seat belt therefrom, the clutch member 42, because of its frictional driven engagement with the ratchet member 46, rotates in the counterclockwise direction as illustrated in FIG. 5 so as to move the first leg 80 of the slot about the projection 76. At the same time, the coaction between the cam follower 64 and the cam track 62 moves the holdout member 58 radially inwardly and out of engagement with the tab 56; however, before moving out of engagement with the tab 56, the clutch member 42 has moved to the position illustrated in FIG. 6 where the leg 80 of the slot coacts with the projection 76 to maintain the locking pawl 72 in the unlocked position.

The components will remain in the position shown in FIG. 6 so long as the seat belt is being extended from the assembly. Once extending movement of the seat belt is stopped, however, and there is a slight rewinding, the clutch member 42 will move in the clockwise direction to the position illustrated in FIG. 7 where the projection 76 is in the apex of the slot. Additionally, because of the biasing action of the spring 54 on the locking pawl 52 the projection 76 will move forwardly to engage the forward extremity of the second leg 82 of the slot. Upon subsequent extending movement of the seat belt, therefore, the clutch member 42 will rotate in the clockwise direction from the position illustrated in FIG. 7 thereby moving the projection 76 along the second leg 82 of the slot to the position illustrated in FIG. 8 where the locking pawl 52 will be in locking engagement with the teeth of the ratchet members 46 and 48 thereby preventing further extending movement of the seat belt. From this position, if the seat belt is released, the biasing action of the rewind spring 47 will retract the seat belt by winding it about the reel means 32.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A retracting reel assembly comprising: support means, reel means rotatably supported by said support means; an elongated flexible element connected to said reel means and adapted to be wound thereon and unwound therefrom; locking means provided with a projection and supported by said support means for movement between locked and unlocked positions for respectively preventing and allowing rotation of said reel means; holding means engageable with said locking means for preventing said locking means from moving to said locked position during initial unwinding of said flexible element from said reel means; and actuator means including a slot through which said projection extends, said slot having a first leg for disposition about said projection whereby said actuating means moves in response to initial unwinding rotation of said reel means to prevent said locking means from moving toward said locked position, said slot having a second leg for disposition about said projection whereby said actuating means moves in response to a slight winding followed by unwinding rotation of said reel means to move said locking means to said locked position.

2. An assembly as set forth in claim 1 wherein said actuation means includes a platelike clutch member supported coaxially with said reel means, said clutch member being frictionally driven by said reel means.

3. An assembly as set forth in claim 2 with first biasing means urging said clutch member into frictional engagement with said reel means.

4. An assembly as set forth in claim 3 wherein said reel means includes a least one circular ratchet member, said locking means engaging said ratchet member in said locked position.

5. An assembly as set forth in claim 4 including second biasing means for urging said locking means toward said locked position.

6. An assembly as set forth in claim 5 wherein said holding means includes a holdout member movable between a first position engaging said locking means and a second position out of engagement with said locking means and an input member responsive to rotation of said reel means for moving said holdout member from said first position toward said second position during unwinding rotation of said reel means and in the opposite direction during winding rotation of said reel means.

7. An assembly as set forth in claim 6 wherein said reel means includes third biasing means for urging winding rotation thereof.

8. An assembly as set forth in claim 7 wherein said slot is generally V-shaped with said legs thereof diverging from one another from an apex.

9. An assembly as set forth in claim 8 wherein said clutch member is mounted to rotate with said reel means during winding rotation of the latter to urge said apex of said slot into engagement with said projection.

10. An assembly as set forth in claim 9 wherein said clutch member and said ratchet member are disposed adjacent one another and said first biasing means reacts with said support means to urge said clutch member toward said ratchet member.

11. An assembly as set forth in claim 10 wherein: said support means includes a generally U-shaped bracket having a base and parallel sidewalls, and a shaft supported by said sidewalls; said reel means includes a cylinder disposed concentrically about said shaft, a pair of said ratchet members which are platelike and are secured to opposite ends of said cylinder, said ratchet members being supported by said shaft for rotation relative to said bracket, said cylinder having a slot extending therealong and said flexible element is connected to said shaft and extends through said slot to be wound and unwound about said cylinder between said ratchet members; said locking means includes a locking pawl extending between said sidewalls and a pin extending between and supported by said sidewalls, said locking pawl being rotatably supported by said pin for movement between said locked and unlocked positions.

12. An assembly as set forth in claim 11 wherein said input member is disposed for rotation with one of said ratchet members and includes a cam track which is at least in part spirally disposed about the axis of said shaft, and said holdout member includes a cam follower portion disposed in said cam track for moving said holdout member radially during winding and unwinding rotation of said reel means.

13. An assembly as set forth in claim 12 wherein said holdout member has an elongated opening therein disposed about said shaft, and peg and slot means interconnecting said holdout member and the adjacent sidewall for preventing said holdout member from rotating about the axis of said shaft, a tab extending from said locking pawl for engaging said holdout member.

14. An assembly as set forth in claim 1 wherein said first leg of said slot is disposed along an arc having a center coincident with the axis of rotation of said reel means.

* * * * *